(12) United States Patent
Townsend (10) Patent No.: US 11,854,355 B2
(45) Date of Patent: Dec. 26, 2023

(54) PROXIMITY ALARM ASSEMBLY (71) Applicant: Mark Townsend, Monument, CO (US)

(72) Inventor: Mark Townsend, Monument, CO (US)

( * ) Notice: Subject to any disclaimer, the term of this patent is extended or adjusted under 35 U.S.C. 154(b) by 374 days.

(21) Appl. No.: 17/323,066

(22) Filed: May 18, 2021

(65) Prior Publication Data
US 2022/0375317 A1 Nov. 24, 2022

(51) Int. Cl.
G08B 13/196 (2006.01)
H04N 7/18 (2006.01)
H04N 23/65 (2023.01)
H04N 23/90 (2023.01)
H04N 23/661 (2023.01)

(52) U.S. Cl.
CPC .  G08B 13/19602 (2013.01); G08B 13/19645 (2013.01); G08B 13/19656 (2013.01); H04N 7/181 (2013.01); H04N 23/65 (2023.01); H04N 23/661 (2023.01); H04N 23/90 (2023.01)

(58) Field of Classification Search
CPC ........ G08B 13/19645; G08B 13/19602; G08B 13/19632; H04N 7/181; H04N 23/90; H04N 23/45; H04N 23/698
See application file for complete search history.

(56) References Cited

U.S. PATENT DOCUMENTS

| 4,064,825 A | 12/1977 | Sly |
| 6,195,310 B1 | 2/2001 | Morgan, II |
| 9,165,444 B2 * | 10/2015 | Scalisi .................... H04N 7/188 |
| 9,564,030 B2 | 2/2017 | Hamilton |
| 10,630,899 B2 * | 4/2020 | Chuang ............ G08B 13/19619 |
| 11,393,210 B2 * | 7/2022 | Felhi ....................... G06V 20/52 |
| 2003/0067385 A1 | 4/2003 | Shank |
| 2005/0099500 A1 * | 5/2005 | Fujita ................ H04N 21/42202 348/207.99 |
| 2007/0109407 A1 * | 5/2007 | Thompson ....... G08B 13/19632 348/143 |
| 2013/0007540 A1 * | 1/2013 | Angelsmark ......... H04L 41/069 714/57 |
| 2014/0224289 A1 | 8/2014 | Kim |
| 2018/0302559 A1 * | 10/2018 | Lee ....................... H04N 23/667 |
| 2022/0141975 A1 * | 5/2022 | Malloy ..................... G06F 3/02 361/807 |

FOREIGN PATENT DOCUMENTS

WO    WO03023728    3/2003

* cited by examiner

Primary Examiner — Boubacar Abdou Tchoussou (57) ABSTRACT

A proximity alarm assembly includes a personal electronic device that has wireless communication capabilities. A camera unit has a plurality of cameras facilitate 360.0 degree video surveillance of an area. A motion unit has a plurality of sensors to facilitate 360.0 motion surveillance of the area. Each of the motion unit and the camera unit is in wireless communication with the personal electronic device. Moreover, the personal electronic device produces an alert when motion unit senses motion to alert a user to the motion. An alert unit is positionable near the user and the alert unit is actuated to emit an audible alert and a visual alert when either of the camera unit or the motion unit fails to communicate with the personal electronic device.

5 Claims, 7 Drawing Sheets

PROXIMITY ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to alarm devices and more particularly pertains to a new alarm device for alerting a user to motion in a remote area. The device includes 360.0 degree motion sensing and 360.0 degree video recording. A personal electronic device emits and alert and displays video footage when the device senses motion in the area. Additionally, an alert unit is actuated to alert the user when the alarm device fails to communicate with the personal electronic device.

(2) Description of Related Art Including Information Disclosed Under 37 CFR 1.97 and 1.98

The prior art relates to alarm devices including a motion alarm that includes a trip wire for actuating a mechanical alert. The prior art discloses an animal motion alert device that alerts a user to the presence of animals in a chosen location. The prior art discloses a variety of motion sensing alarms that each include a plurality of sensors that are strategically positioned to establish a perimeter around a user to alerting the user to an intruder that crosses the perimeter.

BRIEF SUMMARY OF THE INVENTION

An embodiment of the disclosure meets the needs presented above by generally comprising a personal electronic device that has wireless communication capabilities. A camera unit has a plurality of cameras facilitate 360.0 degree video surveillance of an area. A motion unit has a plurality of sensors to facilitate 360.0 motion surveillance of the area. Each of the motion unit and the camera unit is in wireless communication with the personal electronic device. Moreover, the personal electronic device produces an alert when motion unit senses motion to alert a user to the motion. An alert unit is positionable near the user and the alert unit is actuated to emit an audible alert and a visual alert when either of the camera unit or the motion unit fails to communicate with the personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new alarm device embodying the principles and concepts of an embodiment of the disclosure and generally designated by the reference numeral 10 will be described.

As best illustrated in FIGS. 1 through 7, the proximity alarm assembly 10 generally comprises a personal electronic device 12 that has wireless communication capabilities, such as a smart phone or other similar type of device. A camera unit 14 is included and the camera unit 14 includes a plurality of cameras 16. The plurality of cameras 16 is arranged to form a ring to facilitate 360.0 degree video surveillance of an area 18. The area 18 might be a camping spot, a yard or any other area 18 that a user 20 might wish to surveil. The camera unit 14 is in wireless communication with the personal electronic device 12 thereby facilitating the personal electronic device 12 to display the video surveillance. In this way a user 20 can view the video surveillance in real time.

The camera unit 14 comprises a camera disk 22 that has an outer surface 24, and the outer surface 24 is continuously arcuate about a center point of the camera disk 22. Each of the cameras 16 is positioned on the outer surface 24, and the cameras 16 are spaced apart from each other and are distributed around a full circumference of the outer surface 24. Each of the cameras 16 may comprise a digital video camera or the like. The camera unit 14 includes a globe 26 and the camera disk 22 is positioned within the globe 26. Moreover, the globe 26 is comprised of a translucent material to pass light onto each of the cameras 16.

A motion unit 28 is provided and the motion unit 28 includes a plurality of sensors 30. The plurality of sensors 30 are arranged to form a ring to facilitate 360.0 motion surveillance of the area 18. Each of the sensors 30 may comprise an electronic motion sensor or the like. The motion unit 28 is in wireless communication with the personal electronic device 12 and the personal electronic device 12 produces an alert when motion unit 28 senses motion. In this way the personal electronic device 12 can alert a user 20 to the motion.

The motion unit 28 includes a motion disk 32 that has an upper surface 34, a lower surface 36 and an exterior surface 38 extending between the upper surface 34 and the lower surface 36. The upper surface 34 is coupled to the globe 26 and the motion disk 32 is oriented to lie on a plane that is coplanar with the camera disk 22. Each of the sensors 30 is positioned on the exterior surface 38, and the sensors 30 are spaced apart from each other and are distributed around a full circumference of the exterior surface 38. A control circuit 40 is positioned in the globe 26 and the control circuit 40 is electrically coupled to each of the cameras 16. The control circuit 40 is electrically coupled to each of the sensors 30 and the control circuit 40 receives an alert input when one or more of the sensors 30 senses motion. Each of the cameras 16 is turned on to record video footage when the control circuit 40 receives the alert input. Additionally, the control circuit 40 receives a no signal input.

Figure 3:
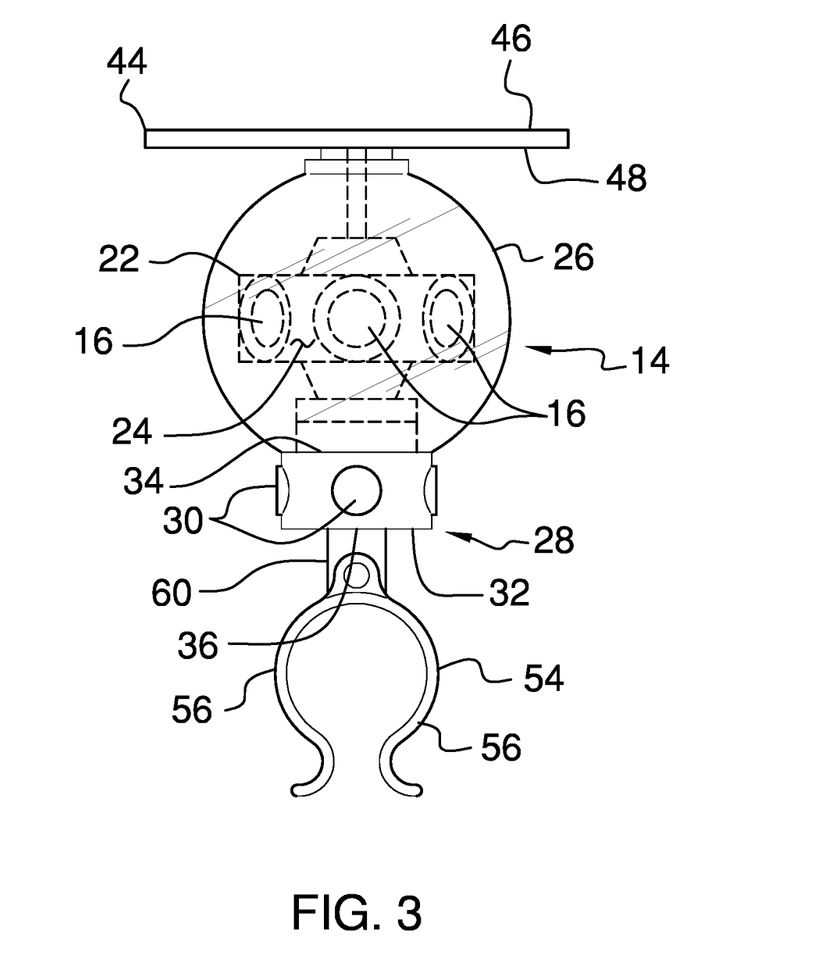
FIG. 3 is a right side phantom view of an embodiment of the disclosure.
Figure 4:
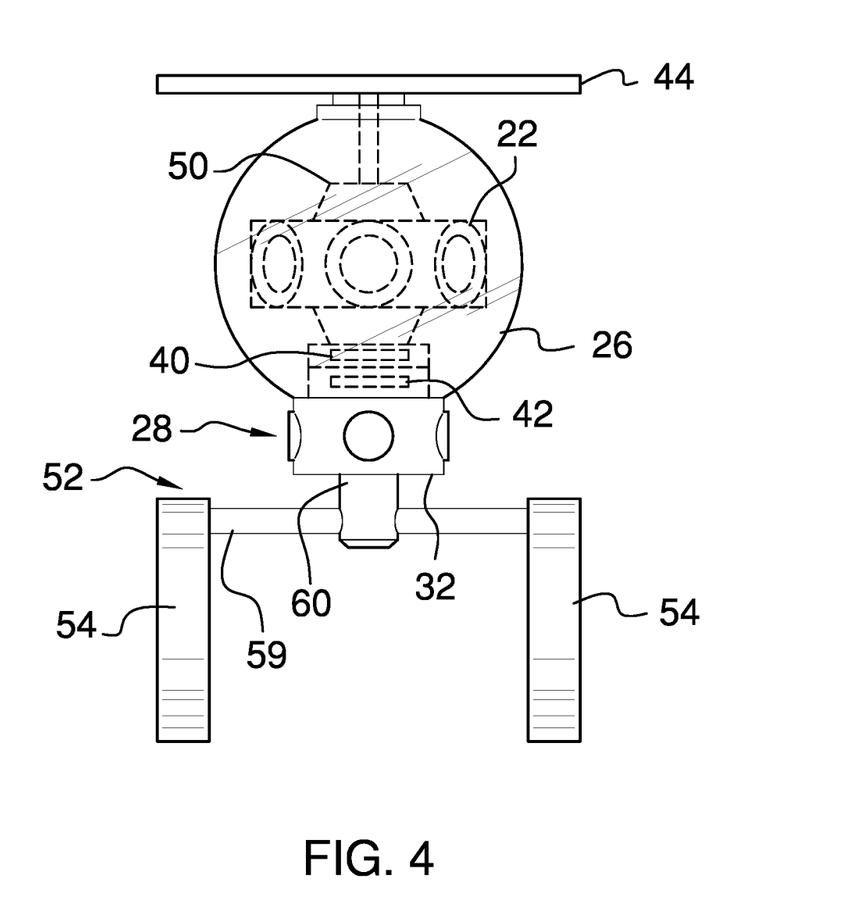
FIG. 4 is a front phantom view of an embodiment of the disclosure.

A transceiver 42 is positioned in the globe 26 and the transceiver 42 is electrically coupled to the control circuit 40. The transceiver 42 is in wireless communication with the personal electronic device 12 thereby facilitating the transceiver 42 to broadcast the video footage to the personal electronic device 12 when the control circuit 40 receives the alert input. Additionally, the control circuit 40 receives the no signal input when the transceiver 42 fails to communicate with the personal electronic device 12. The transceiver 42 may comprise a radio frequency transceiver or the like and the transceiver 42 may employ Bluetooth communication protocols.

Figure 1:
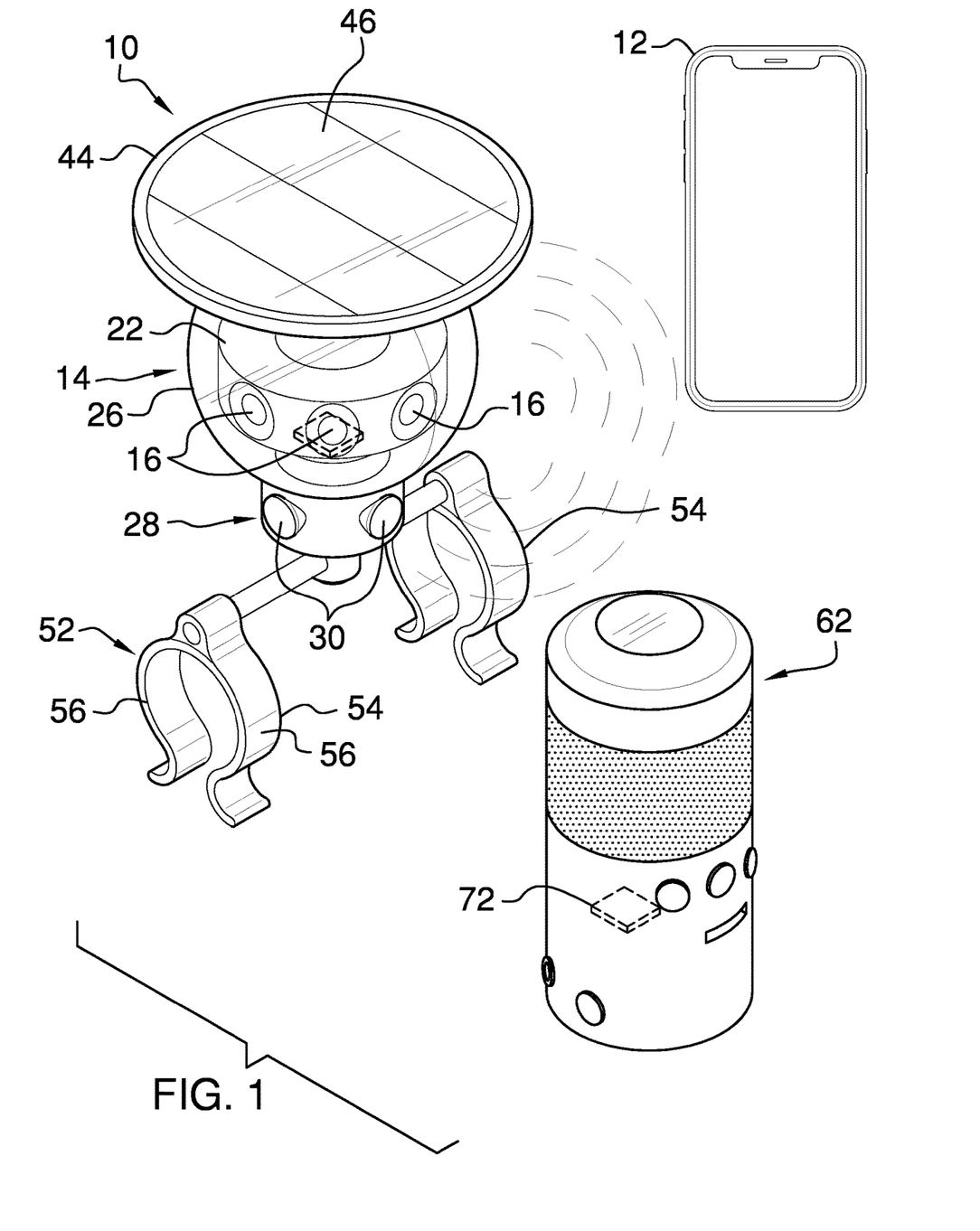
FIG. 1 is a perspective view of a proximity alarm assembly according to an embodiment of the disclosure.
Figure 2:
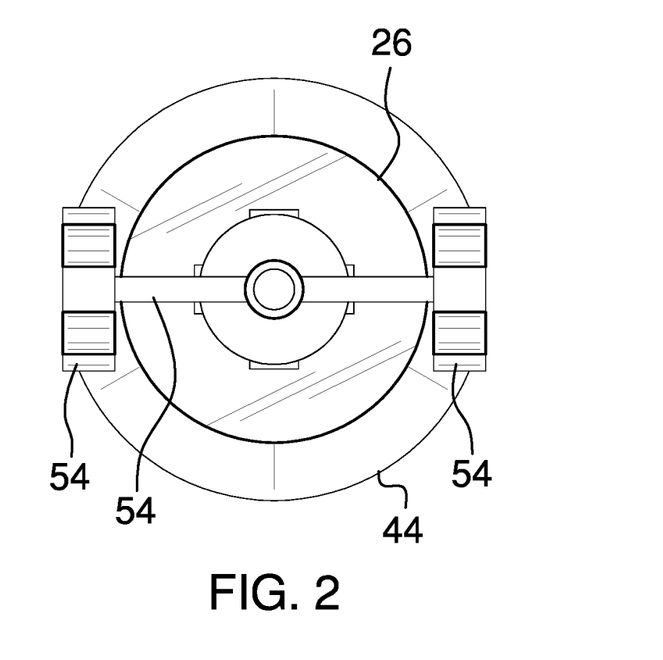
FIG. 2 is a bottom view of an embodiment of the disclosure.

A solar panel 44 is coupled to the camera unit 14 such that the solar panel 44 can be exposed to sunlight. The solar panel 44 has a bottom side 46 and a top side 48, and the bottom side 46 is coupled to the globe 26 such that the top side 48 can be exposed to sunlight. The solar panel 44 is positioned on an opposite side of the globe 26 with respect to the motion disk 32. Moreover, the bottom side 46 of the solar panel 44 lies on a plane that is oriented coplanar with the upper surface 34 of the motion disk 32. A rechargeable battery 50 is positioned in the globe 26 and the rechargeable battery 50 is electrically coupled to the control circuit 40. Additionally, the rechargeable battery 50 is electrically coupled to the solar panel 44 such that the solar panel 44 charges the rechargeable battery 50.

A mount 52 is provided and each of the camera unit 14 and the motion unit 28 is coupled to the mount 52. The mount 52 includes a plurality of clips 54 and each of the clips 54 has arms 56 is biased together. Each of the clips 54 can engage a support 58 for mounting the camera unit 14 and the motion unit 28 to the support 58. The support 58 might be a tree branch, a tent pole, a table or any other object that is positioned in the area 18 in which the user 20 wishes to surveil. Each of the clips 54 extends downwardly from a member 59 and the mount 52 includes an engagement 60 extending upwardly from the member 59. The engagement 60 is centrally positioned between the clips 54 and the engagement 60 is coupled to the lower surface 36 of the motion disk 32.

Figure 5:
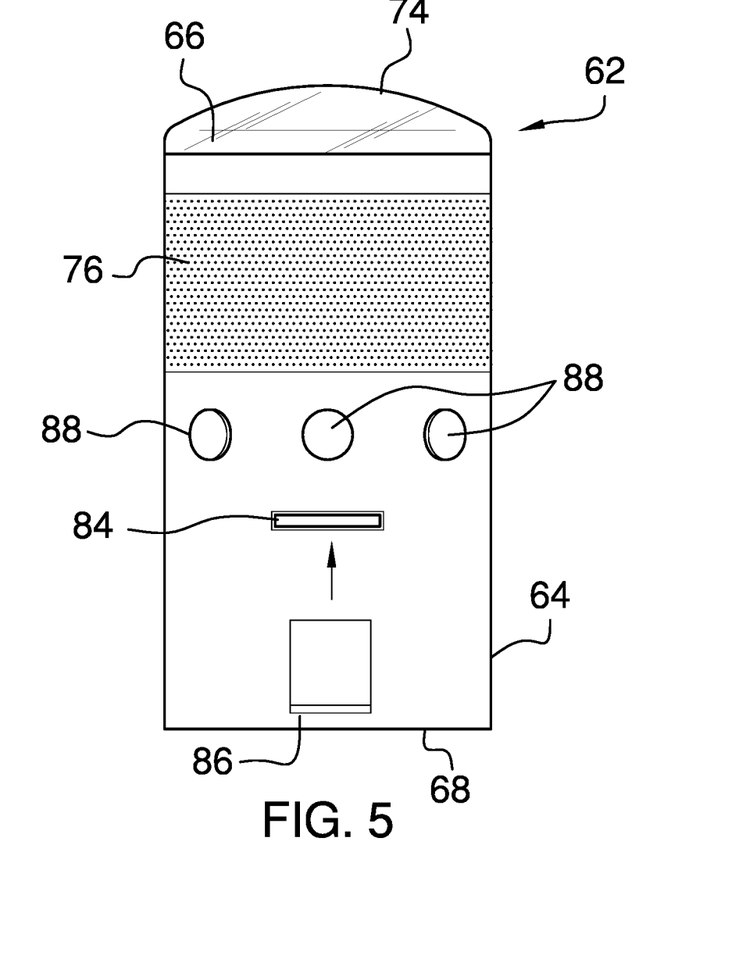
FIG. 5 is a front view of an alert unit of an embodiment of the disclosure.
Figure 6:
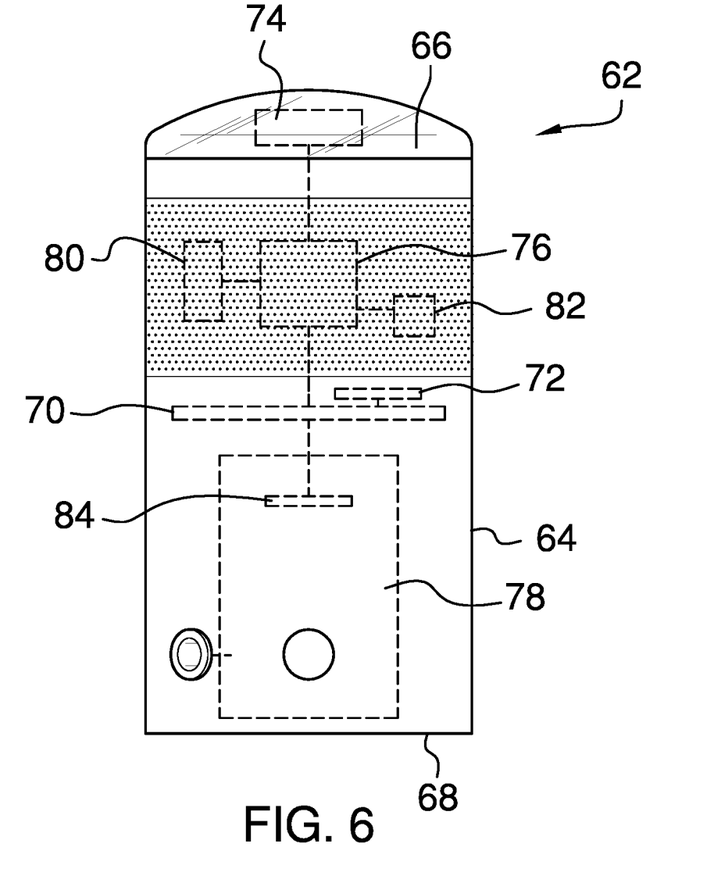
FIG. 6 is a back phantom view of an alert unit of an embodiment of the disclosure.

An alert unit 62 is provided and the alert unit 62 is positionable near the user 20 to audibly and visually communicate with the user 20. The alert unit 62 is in wireless communication with the camera unit 14 and the motion unit 28. Additionally, the alert unit 62 is actuated to emit an audible alert and a visual alert when either of the camera unit 14 or the motion unit 28 fails to communicate with the personal electronic device 12. The alert unit 62 comprises a cylinder 64 that has an upper end 66 and an outer wall 68. An alert control circuit 70 is positioned in the cylinder 64 and the alert control circuit 70 receives an alarm input.

The alert unit 62 includes a receiver 72 that is positioned in the cylinder 64. The receiver 72 is electrically coupled to the alert control circuit 70 and the receiver 72 is in wireless communication with the transceiver 42 in the globe 26 of the camera unit 14. The transceiver 42 broadcasts an alert signal to the receiver 72 when the control circuit 40 in the globe 26 receives the no signal input. Additionally, the alert control circuit 70 receives the alarm input when the receiver 72 receives the alert signal. The receiver 72 may comprise a radio frequency receiver or the like.

The alert unit 62 includes a light emitter 74 that is coupled to the upper end 66 of the cylinder 64 and the light emitter 74 emits light outwardly from the cylinder 64. The light emitter 74 is electrically coupled to the alert control circuit 70 and the light emitter 74 is turned on when the alert control circuit 70 receives the alarm input. In this way the light emitter 74 can visually alert the user 20 that motion has been detected. The light emitter 74 may comprise a light emitting diode that is capable of emitting light in variety of different colors.

The alert unit 62 includes a speaker 76 that is integrated into the cylinder 64 to emit an audible alert outwardly from the cylinder 64. The speaker 76 is electrically coupled to the alert control circuit 70 and the speaker 76 is turned on when the alert control circuit 70 receives the alarm input. In this way the speaker 76 can audibly alert the user 20 that motion has been detected. The speaker 76 may be an electronic speaker or the like that has sufficient volume to be clearly heard from 100.0 feet away. The alert unit 62 includes a power supply 78 that is integrated into the cylinder 64, the power supply 78 is electrically coupled to the alert control circuit 70 and the power supply 78 comprising at least one battery.

The alert unit 62 might include an electronic memory 80 and a microphone 82 for recording audio messages into the electronic memory 80. The electronic memory 80 may be electrically coupled to the alert control circuit 70 thereby facilitating the speaker 76 to audibly emit the recorded audio message when the alert control circuit 70 receives the alarm input. A data port 84 may be recessed into the outer wall 68 of the cylinder 64 for receiving a data storage card 86. The data port 84 might be electrically coupled to the alert control circuit 70 for downloading audio data into the electronic memory 80 from the data card 86. The alert unit 62 might also include a plurality of control buttons 88 for controlling operation parameters of the alert unit 62, including but not being limited to, recording audio messages, changing the color of light emitted by the light emitter 74, power on and power off.

Figure 7:
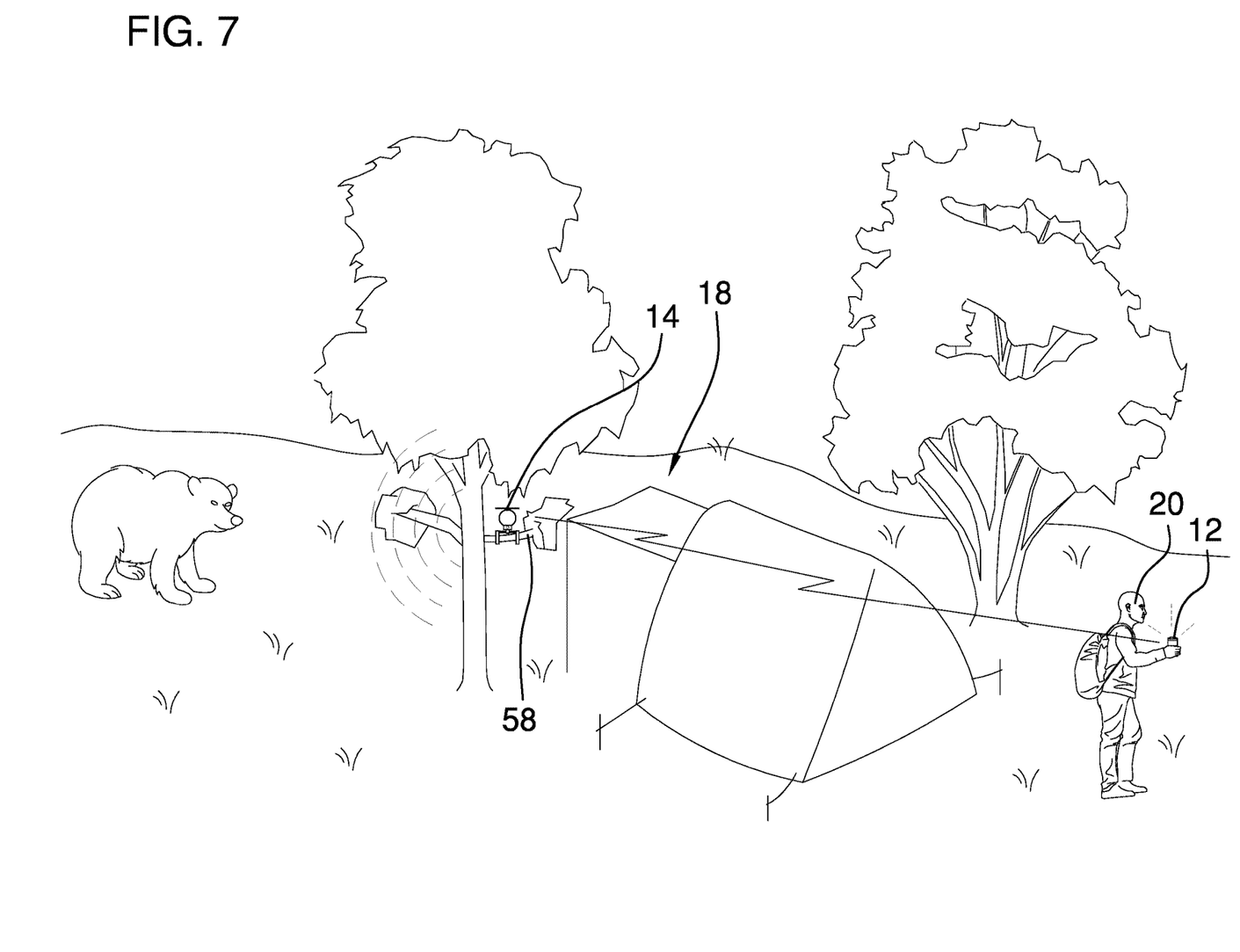
FIG. 7 is a perspective in-use view of an embodiment of the disclosure.

In use, the mount 52 is positioned at a desired location that the user 20 wishes to surveil. The personal electronic device 12 alerts the user 20 when the motion unit 28 senses motion and the personal electronic device 12 displays the video footage that is captured by the cameras 16. In this way the user 20 can monitor real time video footage of the area 18 when an intruder enters the area 18. The alert unit 62 is turned on when the transceiver 42 is not able to communicate with the personal electronic device 12. In this way the user 20 can be alerted to the intruder when the personal electronic device 12 is turned off or when the personal electronic device 12 has no signal. Thus, a camper, for example, can be alerted when a wild animal enters the camper's campsite in a location that has no cellular phone signal.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A proximity alarm assembly for alerting a user that motion has been detected in a protected area, said assembly comprising:
    a personal electronic device having wireless communication capabilities;
    a camera unit having a plurality of cameras, said plurality of cameras being arranged to form a ring wherein said camera unit is configured to facilitate 360.0 degree video surveillance of an area, said camera unit being in wireless communication with said personal electronic device wherein said personal electronic device is configured to display the video surveillance;
    a motion unit having a plurality of sensors, said plurality of sensors being arranged to form a ring wherein said motion unit is configured to facilitate 360.0 motion surveillance of the area, said motion unit being in wireless communication with said personal electronic device, said personal electronic device producing an alert when motion unit senses motion wherein said personal electronic device is configured to alert a user to the motion;
    a mount having each of said camera unit and said motion unit being coupled to said mount wherein said mount is configured to secure said camera unit and said motion unit to a support; and
    an alert unit being positionable near the user wherein said alert unit is configured to audibly and visually communicate with the user, said alert unit being in wireless communication with said camera unit and said motion unit, said alert unit being actuated to emit an audible alert and a visual alert when either of said camera unit or said motion unit fails to communicate with said personal electronic device;
    wherein said camera unit comprises
        a camera disk having an outer surface, said outer surface being continuously arcuate about a center point of said camera disk, each of said cameras being positioned on said outer surface, said cameras being spaced apart from each other and being distributed around a full circumference of said outer surface, and
        a globe having said camera disk being positioned within said globe, said globe being comprised of a translucent material wherein said globe is configured to pass light onto each of said cameras;
    wherein said motion unit includes a motion disk having an upper surface, a lower surface and an exterior surface extending between said upper surface and said lower surface, said upper surface being coupled to said globe, said motion disk being oriented to lie on a plane being coplanar with said camera disk, each of said sensors being positioned on said exterior surface, said sensors being spaced apart from each other and being distributed around a full circumference of said exterior surface; and
    wherein said mount includes a plurality of clips, each of said clips having arms being biased together wherein each of said clips is configured to engage a support for mounting said camera unit and said motion unit to the support, each of said clips extending downwardly from a member, said mount including an engagement extending upwardly from said member, said engagement being centrally positioned between said clips, said engagement being coupled to said lower surface of said motion disk.

2. The assembly according to claim 1, wherein said motion unit includes:
    a control circuit being positioned in said globe, said control circuit being electrically coupled to each of said cameras, said control circuit being electrically coupled to each of said sensors, said control circuit receiving an alert input when one or more of said sensors senses motion, each of said cameras being turned on to record video footage when said control circuit receives said alert input, said control circuit receiving a no signal input;
    a transceiver being positioned in said globe, said transceiver being electrically coupled to said control circuit, said transceiver being in wireless communication with said personal electronic device thereby facilitating said transceiver to broadcast the video footage to said personal electronic device when said control circuit receives said alert input, said control circuit receiving said no signal input when said transceiver fails to communicate with said personal electronic device;
    a solar panel being coupled to said camera unit wherein said solar panel is configured to be exposed to sunlight, said solar panel having a bottom side and a top side, said bottom side being coupled to said globe having said top side being exposed to sunlight, said solar panel being positioned on an opposite side of said globe with respect to said motion disk, said bottom side of said solar panel lying on a plane being oriented coplanar with said upper surface of said motion disk; and a rechargeable battery being positioned in said globe, said rechargeable battery being electrically coupled to said control circuit, said rechargeable battery being electrically coupled to said solar panel such that said solar panel charges said rechargeable battery.

3. The assembly according to claim 2, wherein said alert unit comprises:

a cylinder having an upper end and an outer wall;

an alert control circuit being positioned in said cylinder, said alert control circuit receiving an alarm input; and a receiver being positioned in said cylinder, said receiver being electrically coupled to said alert control circuit, said receiver being in wireless communication with said transceiver in said globe of said camera unit, said transceiver broadcasting an alert signal to said receiver when said control circuit in said globe receives said no signal input, said alert control circuit receiving said alarm input when said receiver receives said alert signal.

4. A proximity alarm assembly for alerting a user that motion has been detected in a protected area, said assembly comprising:

a personal electronic device having wireless communication capabilities;

a camera unit having a plurality of cameras, said plurality of cameras being arranged to form a ring wherein said camera unit is configured to facilitate 360.0 degree video surveillance of an area, said camera unit being in wireless communication with said personal electronic device wherein said personal electronic device is configured to display the video surveillance;

a motion unit having a plurality of sensors, said plurality of sensors being arranged to form a ring wherein said motion unit is configured to facilitate 360.0 motion surveillance of the area, said motion unit being in wireless communication with said personal electronic device, said personal electronic device producing an alert when motion unit senses motion wherein said personal electronic device is configured to alert a user to the motion;

a mount having each of said camera unit and said motion unit being coupled to said mount wherein said mount is configured to secure said camera unit and said motion unit to a support;

an alert unit being positionable near the user wherein said alert unit is configured to audibly and visually communicate with the user, said alert unit being in wireless communication with said camera unit and said motion unit, said alert unit being actuated to emit an audible alert and a visual alert when either of said camera unit or said motion unit fails to communicate with said personal electronic device;

wherein said camera unit comprises
a camera disk having an outer surface, said outer surface being continuously arcuate about a center point of said camera disk, each of said cameras being positioned on said outer surface, said cameras being spaced apart from each other and being distributed around a full circumference of said outer surface, and
a globe having said camera disk being positioned within said globe, said globe being comprised of a translucent material wherein said globe is configured to pass light onto each of said cameras;

wherein said motion unit includes a motion disk having an upper surface, a lower surface and an exterior surface extending between said upper surface and said lower surface, said upper surface being coupled to said globe, said motion disk being oriented to lie on a plane being coplanar with said camera disk, each of said sensors being positioned on said exterior surface, said sensors being spaced apart from each other and being distributed around a full circumference of said exterior surface;

wherein said motion unit includes
a control circuit being positioned in said globe, said control circuit being electrically coupled to each of said cameras, said control circuit being electrically coupled to each of said sensors, said control circuit receiving an alert input when one or more of said sensors senses motion, each of said cameras being turned on to record video footage when said control circuit receives said alert input, said control circuit receiving a no signal input,
a transceiver being positioned in said globe, said transceiver being electrically coupled to said control circuit, said transceiver being in wireless communication with said personal electronic device thereby facilitating said transceiver to broadcast the video footage to said personal electronic device when said control circuit receives said alert input, said control circuit receiving said no signal input when said transceiver fails to communicate with said personal electronic device,
a solar panel being coupled to said camera unit wherein said solar panel is configured to be exposed to sunlight, said solar panel having a bottom side and a top side, said bottom side being coupled to said globe having said top side being exposed to sunlight, said solar panel being positioned on an opposite side of said globe with respect to said motion disk, said bottom side of said solar panel lying on a plane being oriented coplanar with said upper surface of said motion disk, and
a rechargeable battery being positioned in said globe, said rechargeable battery being electrically coupled to said control circuit, said rechargeable battery being electrically coupled to said solar panel such that said solar panel charges said rechargeable battery;

wherein said alert unit comprises:
a cylinder having an upper end and an outer wall;
an alert control circuit being positioned in said cylinder, said alert control circuit receiving an alarm input; and
a receiver being positioned in said cylinder, said receiver being electrically coupled to said alert control circuit, said receiver being in wireless communication with said transceiver in said globe of said camera unit, said transceiver broadcasting an alert signal to said receiver when said control circuit in said globe receives said no signal input, said alert control circuit receiving said alarm input when said receiver receives said alert signal; and wherein said alert unit includes:
a light emitter being coupled to said upper end of said cylinder wherein said light emitter is configured to emit light outwardly from said cylinder, said light emitter being electrically coupled to said alert control circuit, said light emitter being turned on when said alert control circuit receives said alarm input wherein said light emitter is configured to visually alert the user that motion has been detected; and a speaker being integrated into said cylinder wherein said speaker is configured to emit an audible alert outwardly from said cylinder, said speaker being electrically coupled to said alert control circuit, said speaker being turned on when said alert control circuit receives said alarm input wherein said speaker is configured to audibly alert the user that motion has been detected.

5. A proximity alarm assembly for alerting a user that motion has been detected in a protected area, said assembly comprising:

a personal electronic device having wireless communication capabilities;

a camera unit having a plurality of cameras, said plurality of cameras being arranged to form a ring wherein said camera unit is configured to facilitate 360.0 degree video surveillance of an area, said camera unit being in wireless communication with said personal electronic device wherein said personal electronic device is configured to display the video surveillance, said camera unit comprising:

a camera disk having an outer surface, said outer surface being continuously arcuate about a center point of said camera disk, each of said cameras being positioned on said outer surface, said cameras being spaced apart from each other and being distributed around a full circumference of said outer surface; and a globe having said camera disk being positioned within said globe, said globe being comprised of a translucent material wherein said globe is configured to pass light onto each of said cameras;

a motion unit having a plurality of sensors, said plurality of sensors being arranged to form a ring wherein said motion unit is configured to facilitate 360.0 motion surveillance of the area, said motion unit being in wireless communication with said personal electronic device, said personal electronic device producing an alert when motion unit senses motion wherein said personal electronic device is configured to alert a user to the motion, said motion unit including a motion disk having an upper surface, a lower surface and an exterior surface extending between said upper surface and said lower surface, said upper surface being coupled to said globe, said motion disk being oriented to lie on a plane being coplanar with said camera disk, each of said sensors being positioned on said exterior surface, said sensors being spaced apart from each other and being distributed around a full circumference of said exterior surface;

a control circuit being positioned in said globe, said control circuit being electrically coupled to each of said cameras, said control circuit being electrically coupled to each of said sensors, said control circuit receiving an alert input when one or more of said sensors senses motion, each of said cameras being turned on to record video footage when said control circuit receives said alert input, said control circuit receiving a no signal input;

a transceiver being positioned in said globe, said transceiver being electrically coupled to said control circuit, said transceiver being in wireless communication with said personal electronic device thereby facilitating said transceiver to broadcast the video footage to said personal electronic device when said control circuit receives said alert input, said control circuit receiving said no signal input when said transceiver fails to communicate with said personal electronic device;

a solar panel being coupled to said camera unit wherein said solar panel is configured to be exposed to sunlight, said solar panel having a bottom side and a top side, said bottom side being coupled to said globe having said top side being exposed to sunlight, said solar panel being positioned on an opposite side of said globe with respect to said motion disk, said bottom side of said solar panel lying on a plane being oriented coplanar with said upper surface of said motion disk;

a rechargeable battery being positioned in said globe, said rechargeable battery being electrically coupled to said control circuit, said rechargeable battery being electrically coupled to said solar panel such that said solar panel charges said rechargeable battery;

a mount having each of said camera unit and said motion unit being coupled to said mount, said mount including a plurality of clips, each of said clips having arms being biased together wherein each of said clips is configured to engage a support for mounting said camera unit and said motion unit to the support, each of said clips extending downwardly from a member, said mount including an engagement extending upwardly from said member, said engagement being centrally positioned between said clips, said engagement being coupled to said lower surface of said motion disk; and an alert unit being positionable near the user wherein said alert unit is configured to audibly and visually communicate with the user, said alert unit being in wireless communication with said camera unit and said motion unit, said alert unit being actuated to emit an audible alert and a visual alert when either of said camera unit or said motion unit fails to communicate with said personal electronic device, said alert unit comprising:

a cylinder having an upper end and an outer wall;

an alert control circuit being positioned in said cylinder, said alert control circuit receiving an alarm input;

a receiver being positioned in said cylinder, said receiver being electrically coupled to said alert control circuit, said receiver being in wireless communication with said transceiver in said globe of said camera unit, said transceiver broadcasting an alert signal to said receiver when said control circuit in said globe receives said no signal input, said alert control circuit receiving said alarm input when said receiver receives said alert signal;

a light emitter being coupled to said upper end of said cylinder wherein said light emitter is configured to emit light outwardly from said cylinder, said light emitter being electrically coupled to said alert control circuit, said light emitter being turned on when said alert control circuit receives said alarm input wherein said light emitter is configured to visually alert the user that motion has been detected;

a speaker being integrated into said cylinder wherein said speaker is configured to emit an audible alert outwardly from said cylinder, said speaker being electrically coupled to said alert control circuit, said speaker being turned on when said alert control circuit receives said alarm input wherein said speaker is configured to audibly alert the user that motion has been detected; and a power supply being integrated into said cylinder, said power supply being electrically coupled to said alert control circuit, said power supply comprising at least one battery.

* * * * *